United States Patent
Sausner et al.

(10) Patent No.: US 6,709,026 B2
(45) Date of Patent: Mar. 23, 2004

(54) COUPLING HOUSING AND QUICK-CONNECT COUPLING FOR HOSES AND PIPES IN MOTOR VEHICLES IN THE FORM OF A COMPOSITE STRUCTURE

(75) Inventors: Andreas Sausner, Frankfurt (DE); Thomas Vierneisel, Bensheim (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 25 days.

(21) Appl. No.: 09/759,311

(22) Filed: Jan. 12, 2001

(65) Prior Publication Data

US 2001/0017469 A1 Aug. 30, 2001

(30) Foreign Application Priority Data

Jan. 13, 2000 (DE) .......................... 100 01 100

(51) Int. Cl.$^7$ ................................. F16L 37/00
(52) U.S. Cl. ........................ 285/305; 285/321
(58) Field of Search .................. 285/21.1, 22, 319, 285/321, 285.1, 286.1, 288.6, 305

(56) References Cited

U.S. PATENT DOCUMENTS

| | | | | |
|---|---|---|---|---|
| 4,905,964 A | * | 3/1990 | Shiozaki | 251/149.6 |
| 5,395,140 A | * | 3/1995 | Wiethorn | 285/93 |
| 5,568,946 A | * | 10/1996 | Jackowski | 285/38 |
| 6,155,612 A | * | 12/2000 | Szabo | 285/319 |
| 6,318,764 B1 | * | 11/2001 | Trede et al. | 285/305 |
| 6,347,815 B1 | * | 2/2002 | Kargula et al. | 285/319 |
| 6,371,529 B1 | * | 4/2002 | Szabo et al. | 285/319 |

FOREIGN PATENT DOCUMENTS

DE 37 41 259 6/1989

* cited by examiner

Primary Examiner—Lynne H. Browne
Assistant Examiner—Aaron Dunwoody
(74) Attorney, Agent, or Firm—Young & Basile, P.C.

(57) ABSTRACT

A quick-connect coupling for hoses or pipes with a coupling housing contains a connection piece and a housing part as well as a plug-type fitting wherein the housing part and the connection piece are realized in the form of two parts.

18 Claims, 3 Drawing Sheets

COUPLING HOUSING AND QUICK-CONNECT COUPLING FOR HOSES AND PIPES IN MOTOR VEHICLES IN THE FORM OF A COMPOSITE STRUCTURE

BACKGROUND OF THE INVENTION

The invention is based on a coupling housing for a quick-connect coupling for hoses or pipes which contains a first through-hole, wherein the coupling housing features a connection piece for attaching a hose or a pipe and a housing part for receiving a plug-type fitting.

Quick-connect couplings of the pertinent type must fulfill various, sometimes contradictory requirements. They must be able to connect hoses or pipes to one another in a fluid-tight fashion, wherein the diffusion of volatile components of the fluids in the hoses or pipes, e.g., fuel, oil, hydraulic fluid, refrigerant or the like, should also be as low as possible, and always below the applicable limiting values, some of which are stipulated by law. In addition, it should be possible to reliably and easily connect the pipes or hoses to the coupling housing. At the same time, due to the large quantities of quick-connect couplings produced, the manufacturing costs should be as low as possible.

SUMMARY

The invention aims to develop a coupling housing for a quick-connect coupling as well as a quick-connect coupling for hoses or pipes with additionally improved properties of use and low total manufacturing costs for the detachable connection of hoses or pipes.

According to the invention, this objective is attained with a coupling housing for a quick-connect coupling for hoses or pipes which contains a housing part for receiving a plug-type fitting and a connection piece for attaching a hose or a pipe and which is characterized by the fact that the connection piece and the housing part are realized in the form of two parts.

Due to this composite structure, the housing part as well as the connection piece can be optimally adapted to the various functions to be fulfilled. Despite an increase in the number of components required for the detachable connection of hoses or pipes, this results in lower total manufacturing costs. In addition, the connection of a hose or a pipe and the connection piece can be optimized without affecting the housing part. This connection may, for example, be realized through clamping, bonding, fusing or the like if the materials of the connection piece and the hose or the pipe feature corresponding properties.

In another embodiment of the invention, the connection piece consists of metal, in particular, steel, so that by clamping the hose or the pipe with the connection piece with the aid of a clamping sleeve, it is possible, for example, to produce a functionally reliable and commercially advantageous connection which can be subjected to high loads.

In one variation, it is proposed that the housing part consists of plastic, in particular, a plastic that is resistant to fuel, oil and/or high temperatures, so that the housing part functions reliably under various conditions and different mediums. The use of plastic makes it possible to integrate various functions into the housing part with comparatively low costs. For example, a locking mechanism for the plug-type fitting may be provided in the housing part.

In another embodiment of the invention, it is proposed that the connection piece and the housing part are connected so that they cannot rotate, they form a positive fit, and/or they are integrated. Due to this measure, there are no relative movements between the housing part and the connection piece, and a fluid-tight and diffusion-tight connection between both components is ensured.

In a further refinement of the invention, it is proposed that the housing part features a first through-hole, that a recess for accommodating a plug-type fitting is provided on the first end of the first through-hole, and that the connection piece is arranged on the second end of the first through-hole. Due to these measures, the plug-type fitting is protected from additional mechanical effects in the coupled state and an overall compact design is achieved.

In one embodiment of the invention, the connection piece is partially arranged in the first through-hole so that the forces which can be transmitted between the flange and the housing part are increased.

In a further refinement of the invention, it is proposed that the connection piece contains a flange on its end that faces the second end of the first through-hole such that a large surface is available for joining the connection piece and the housing part.

In another variation, the flange is arranged in the recess for receiving a plug-type fitting so that the flange and the housing part form a positive fit with one another and the pressure of the fluid in the interior of the housing part does not additionally stress the connection between the flange and the housing part.

In another embodiment of the invention, it is proposed that the flange contains at least one recess, and that the recess interacts with one or more projections of the housing part so that a connection between the connection piece and the housing part is produced that can handle high loads and that at least forms a positive fit and does not rotate.

In another variation of the invention, it is proposed that a connecting ring that forms a positive fit and/or that is integrated with the housing part and the flange is arranged on the side of the flange facing away from the housing part. Due to this measure, the connection between the housing part and the connection piece can be subjected to even higher loads.

In another embodiment of the invention, it is proposed that the housing part contains an opening that is essentially perpendicular to the longitudinal axis of the through-hole, and that a locking element can be interlocked in the opening, wherein said locking element interlocks with a plug-type fitting received in the receptacle in the interlocked state such that an unintentional separation of the housing part and the plug-type fitting can be easily prevented.

BRIEF DESCRIPTION OF THE DRAWING

Additional advantages and advantageous embodiments of the invention result from the following description, drawing and claims in which:

DETAILED DESCRIPTION

Figure 1:
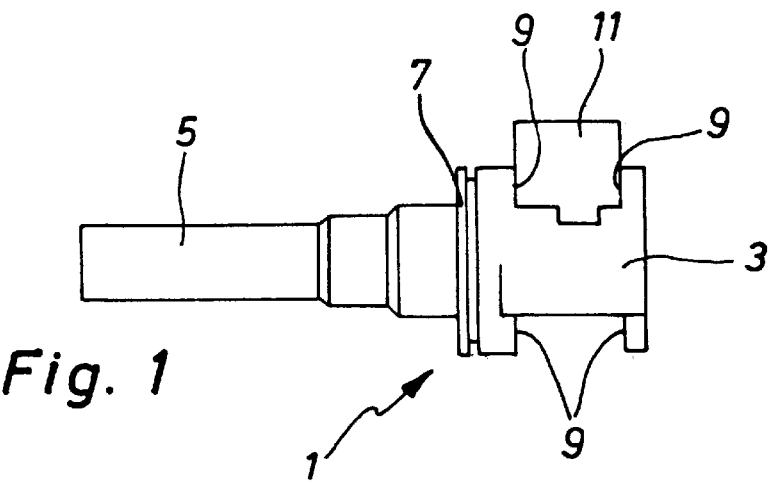
FIG. 1 is a side view of a first embodiment of a quick-connect coupling according to the invention.

FIG. 1 shows a coupling housing 1 for a quick-connect coupling according to the invention without a plug-type fitting. The coupling housing 1 essentially consists of a housing part 3 and a connection piece 5. A not-shown hose or pipe is pushed and clamped onto the connection piece 5. The housing part 3 and the connection piece 5 are realized in the form of two parts. The flange of the connection piece 5 which is not shown in FIG. 1 forms a positive fit and is integrated with the housing part 3. In order to additionally increase the load capacity of this connection, a connecting ring 7, respectively, is pushed over the connection piece 5 and connected to the housing part 3. Due to this measure, the not-shown flange of the connection piece 5 forms a positive fit and is integrated with the housing part 3 and the connecting ring 7, respectively, on both sides. The housing part 3 contains an opening 9, into which a locking element 11 can be inserted. The locking element 11 has the function of interlocking the not-shown plug-type fitting in the housing part 3.

Figure 2:
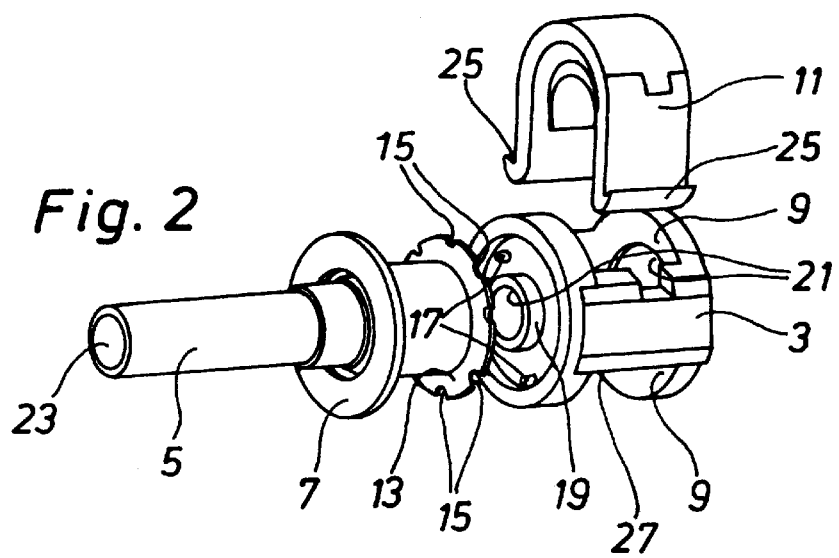
FIG. 2 is the same embodiment in the form of an exploded view.

FIG. 2 shows the arrangement according to FIG. 1 in the form of an exploded view. The flange 13 of the connection piece 5 is clearly visible in this figure. The flange 13 contains several recesses 15 distributed over its circumference and, together with corresponding projections 17 of the housing part 3, enables a connection between the housing part 3 and the connection piece 5 that forms a positive fit and that does not rotate. This figure also shows that the housing part 3 features a collar 19 on its end facing the connection piece 5 that centers the connection piece 5. Also visible in this figure are a first through-hole 21 of the housing part 3 and a second through-hole 23 of the connection piece 5. A plug-type fitting which is not shown in FIG. 2 and which is connected to a hose or a pipe is inserted into the first through-hole 21. The fluid in the pipes or hoses to be connected by means of the quick-connect coupling according to the invention can flow through the plug-type fitting and the second through-hole 21 and 23 in an unobstructed fashion.

It is also easy to see in this representation that the opening 9 is essentially perpendicular to the through-hole 21, and that the locking element 11 contains locking tabs 25 on its lower end, with the locking tabs interlocking the locking element 11 in the housing part 3 in cooperation with the lower edges 27 of the opening 9. This interlocked arrangement can be separated by pressing the locking tabs 25 toward one another.

It is also clearly visible in FIG. 2 that the connecting ring 7 additionally reinforces the connection between the connection piece 5 and the housing part 3 because the connection surface is increased and the connection is protected from external influences, in particular, mechanical influences.

The housing part 3, the connecting ring 7 and the locking element 11 can be advantageously manufactured from plastic because the comparatively complicated geometry of these components can be very precisely and inexpensively realized by means of injection molding or similar manufacturing methods. The connection piece 5 is preferably manufactured from metal, in particular, steel, such that the connection piece 5 is provided with a very high mechanical strength and the hoses or pipes which are not shown in FIG. 2 can be reliably connected to the connection piece 5 by means of clamping or other methods without causing fractures.

Figure 3:
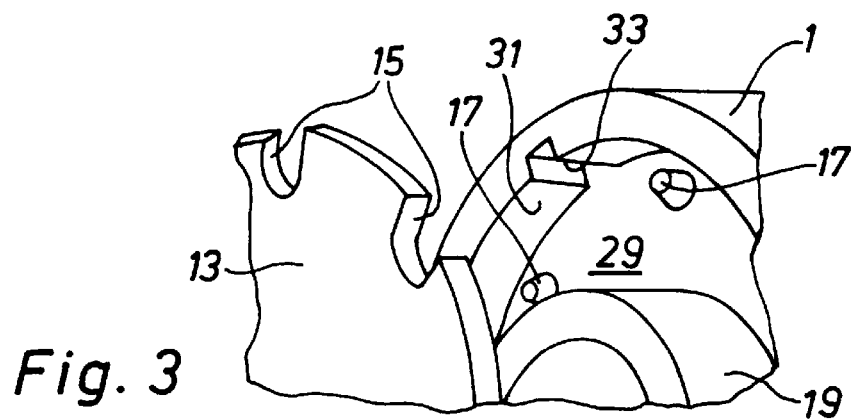
FIG. 3 is an enlarged detail perspective view of the connection between the plug-type fitting and the housing part.

FIG. 3 shows a detail of the exploded view according to FIG. 2. This figure shows the recesses 15 of the flange 13 even more clearly. As mentioned previously, these recesses interact with the projections 17 of the housing part 3. The support surface 29 for the flange 13 in the housing part 3 is formed by the base of an annular depression that is expanded by the collar 19 and an outer wall 31. A longitudinal groove 33 is provided in the outer wall 31, with the longitudinal groove additionally increasing the resistance to rotation between the connection piece 5 and the housing part 3 in cooperation with a corresponding not-shown projection of the flange 13 or the not-shown connecting ring 7.

Figure 4:
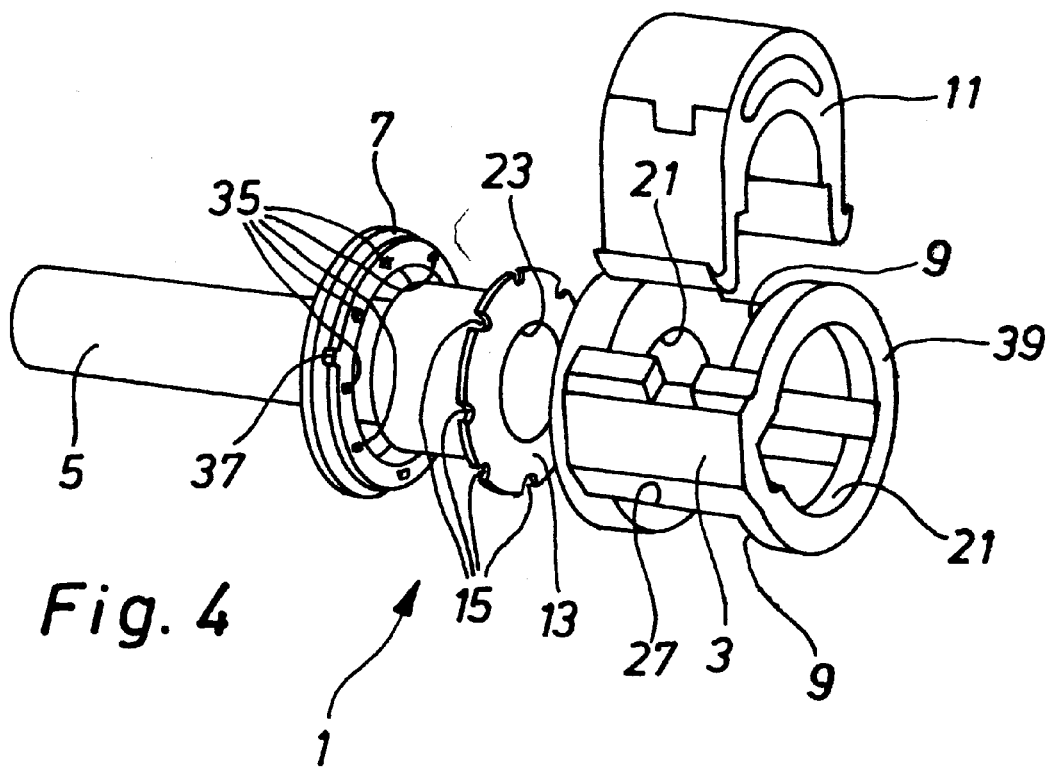
FIG. 4 is another exploded view of a housing part according to the invention.

FIG. 4 shows another exploded view of the arrangement illustrated in the form of a side view in FIG. 1. This figure shows projections 35 of the connecting ring 7 which interact with the recesses 15 of the flange 13 of the connection piece 5 and, optionally, with the projections 17 of the housing part 3 and thus contribute to increasing the strength and resistance to rotation of the connection between the connection piece 5 and the housing part 3. A tab 37 that interacts with the longitudinal groove 33 of the housing part 3 (see FIG. 3) is arranged on the circumference of the connecting ring 7. The connection between the connection piece 5, the housing part 3 and the connecting ring 7 can be realized by means of fusing, in particular, ultrasonic bonding, adhesion, or other joining methods.

It would also be conceivable to realize arrangements in which the connection piece 5 is inserted into the through-hole 21 in the first end 39 of the housing part 3 facing away from the connection piece 5. In the assembled condition, the connection piece 5 protrudes from the second end 40 of the first through-hole. In this design, possible tensile forces between the connection piece 5 and the housing part 3 do not have to be transmitted between the connection piece 5 and the housing part 3 through the joint, but rather these forces can be transmitted through a positive fit.

Figure 5:
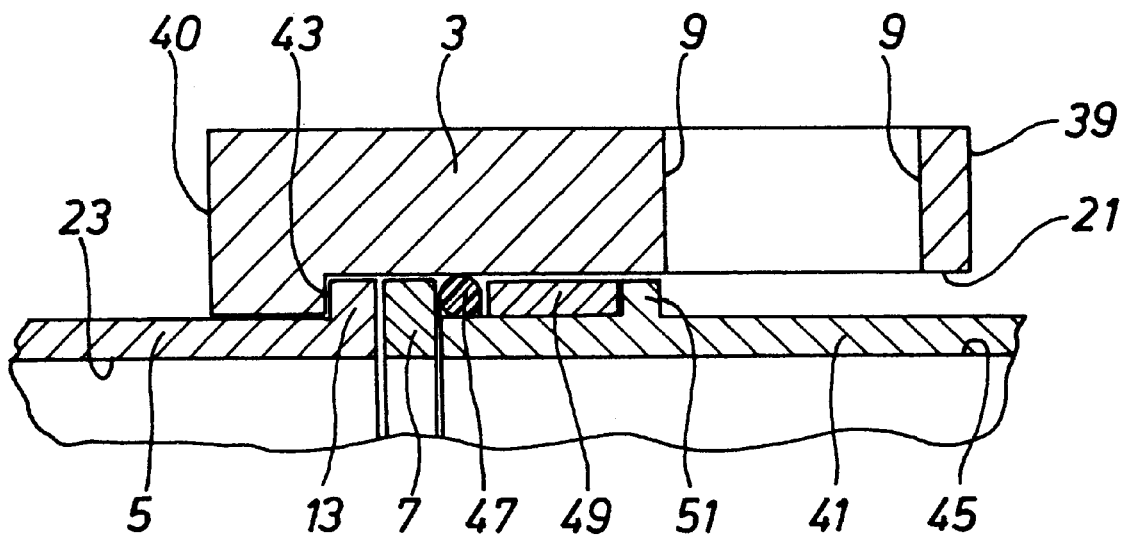
FIG. 5 is a cross sectional representation of a second embodiment of a quick-connect coupling according to the invention.

FIG. 5 shows another embodiment of a quick-connect coupling according to the invention with a housing part 3, a connection piece 5 and a plug-type fitting 41. In this embodiment, the connection piece 5 is inserted into the through-hole 21 on the first end 39 of the housing part 3 until the flange 13 of the connection piece 5 is against a shoulder 43 of the through-hole 21. The connecting ring 7 is situated behind the connection piece 5. The recesses 15 and the projections 17 and 35 are not shown in this figure. The connection between the housing part 3, the connection piece 5 and the connecting ring 7 may be realized analogous to the first embodiment according to FIGS. 1–4.

In order to achieve a superior seal between the not-shown fluid in the second through-hole 23 of the connection piece 5 and the through-hole 45 of the plug-type fitting 41 and the surroundings, an O-ring 47 or another sealing element is arranged in the first through-hole 21. In order to protect the O-ring 47 from damage during the insertion of the plug-type fitting 41, an additional sleeve 49 is provided. If so desired, the sleeve 49 may exert a certain pre-stress upon the O-ring 47 such that the sealing effect is increased. It is also conceivable to provide several O-rings 47 in order to increase the sealing effect.

The plug-type fitting 41 features a collar 51. When the not-shown locking element 11 is inserted into the recess 9, the collar 51 prevents the plug-type fitting 41 from moving out of the through-hole 21 past the locking element 11. Consequently, the plug-type fitting 41 is interlocked in the housing part 3.

Figure 6:
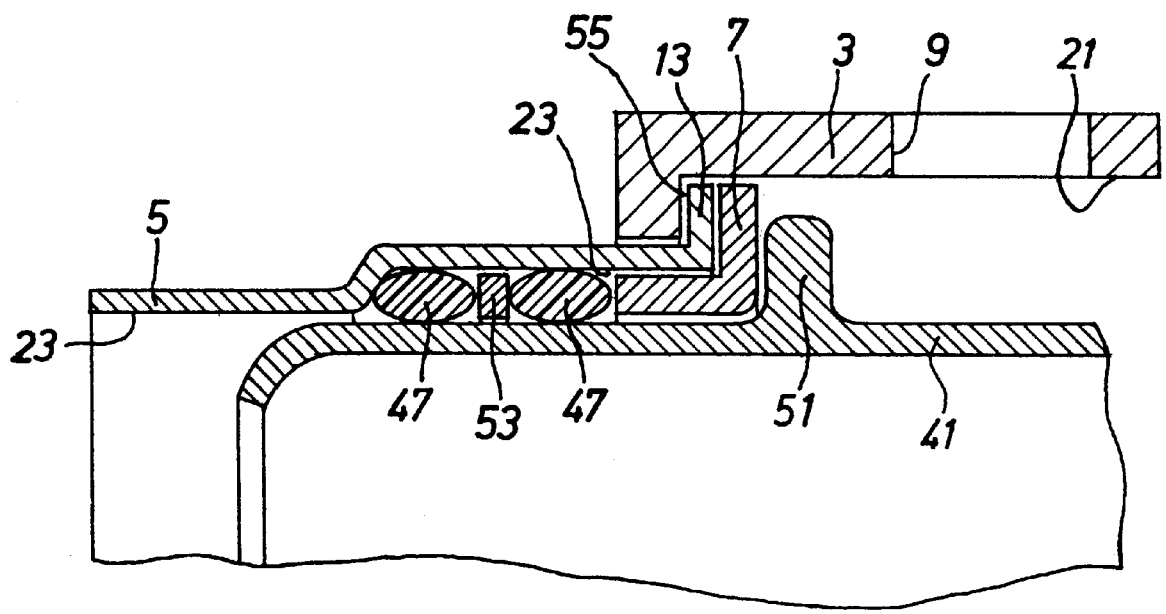
FIG. 6 is a cross sectional representation of a third embodiment of a quick-connect coupling according to the invention.

In another embodiment shown in FIG. 6, the connection piece 5 is designed in such a way that the O-ring(s) 47 is/are arranged in the second through-hole 23 of the connection piece 5. A spacer ring 53 protects the O-rings 47 from being displaced or becoming damaged. In this arrangement, the position of the O-rings 47 prevents the liquid from reaching the surroundings in case the connection 55 between the connection piece 5 and the housing part 3 is not tight due to a manufacturing defect or excessive stress. In this embodiment, the connecting ring 7 and the sleeve 49 are realized as one piece.

All characteristics disclosed in the description, the following claims and the drawing may be essential for the invention individually as well as in arbitrary combinations.

What is claimed:

1. A coupling housing for a quick-connect coupling for hoses or pipes with a housing part for receiving a plug-type fitting and a connection piece for attaching a hose or a pipe comprising:

the connection piece and the housing part being in the form of two non-rotatably connected parts;

the housing part containing a first through-aperture;

a recess adapted for accommodating a plug-type fitting provided on a first end of the first through-aperture; and the connection piece arranged on a second end of the first through-aperture, wherein the connection piece contains a flange on an end of the connection piece spaced from the housing part.

2. The coupling housing according to claim 1 wherein the connection piece is manufactured from metal.

3. The coupling housing according to claim 1 wherein the housing part consists of plastic that is resistant to fuel oil and high temperatures.

4. The coupling housing according to claim 1 wherein the connection piece and the housing part form a positive-fit connection.

5. The coupling housing according to claim 1 wherein the connection piece and the housing part form an integrated connection.

6. The coupling housing according to claim 1 wherein the connection piece is partially arranged in the first through-aperture.

7. The coupling housing according to claim 1 wherein the flange is arrange in the recess adapted for accommodating a plug-type fitting.

8. The coupling housing according to claim 1 wherein the flange has at least one recess, the recess interacting with one projection of the housing part.

9. The coupling housing according to claim 1 wherein the housing part has an opening essentially perpendicular to a longitudinal axis of the through-aperture and a locking element interlocked in the opening, with the locking element interlocking a plug-type fitting that is accommodated in the first through-aperture in the interlocked condition.

10. The coupling housing according to claim 1 further comprising:

at least one aperture formed on the flange, the at least one aperture engaged with a projection carried on the second end of the housing.

11. A coupling housing for a quick-connect coupling for hoses or pipes with a housing pan for receiving a plug-type fitting and a connection piece for attaching a hose or a pipe comprising:

the connection piece and the housing part being in the form of two non-rotatably connected parts; and a connecting ring forming at least one of a positive fit and an integrated connection with the housing part, a flange on the connection piece being arranged on an end of the connection piece spaced from the housing part.

12. The coupling housing according to claim 11 wherein the connection piece is manufactured from metal.

13. The coupling housing according to claim 11 wherein the housing part consists of plastic that is resistant to fuel, oil and high temperatures.

14. The coupling housing according to claim 11 wherein the connection piece and the housing pan form a positive-fit connection.

15. The coupling housing according to claim 11 wherein the connection piece and the housing part form an integrated connection.

16. The coupling housing according to claim 11 further comprising:

the housing part containing a first through-aperture;

a recess adapted for accommodating a plug-type fitting provided on a first end of the first through-aperture; and the connection piece arranged on a second end of the first through-aperture.

17. The coupling housing according to claim 16 wherein the connection piece is partially arranged in the first through-aperture.

18. The coupling housing according to claim 11 wherein the housing part has an opening essentially perpendicular to a longitudinal axis of the through-aperture and a locking element interlocked in the opening, with the locking element interlocking a plug-type fitting that is accommodated in the first through-aperture in the interlocked condition.

* * * * *